(12) United States Patent
Ren et al.

(10) Patent No.: US 11,247,683 B2
(45) Date of Patent: Feb. 15, 2022

(54) BIDIRECTIONAL TRANSMISSION CONTROL SYSTEM FOR VEHICLE

(71) Applicant: Guangzhou Automobile Group Co., Ltd., Guangdong (CN)

(72) Inventors: Qiang Ren, Guangdong (CN); Lingtao Han, Guangdong (CN); Ang Yao, Guangdong (CN); Ted S Huang, Guangdong (CN); Wei Xu, Guangdong (CN); Chunyun Zheng, Guangdong (CN)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 212 days.

(21) Appl. No.: 16/482,272

(22) PCT Filed: Apr. 26, 2018

(86) PCT No.: PCT/CN2018/084690
§ 371 (c)(1),
(2) Date: Jul. 31, 2019

(87) PCT Pub. No.: WO2018/196826
PCT Pub. Date: Nov. 1, 2018

(65) Prior Publication Data
US 2021/0276555 A1    Sep. 9, 2021

(30) Foreign Application Priority Data

Apr. 27, 2017    (CN) .......................... 201710288538.0

(51) Int. Cl.
*B60W 30/182*    (2020.01)
*B60W 10/06*    (2006.01)
(Continued)

(52) U.S. Cl.
CPC .......... *B60W 30/182* (2013.01); *B60W 10/06* (2013.01); *B60W 10/14* (2013.01);
(Continued)

(58) Field of Classification Search
CPC .... B60W 10/06; B60W 10/11; B60W 10/119; B60W 10/14; B60W 10/18;
(Continued)

(56) References Cited

U.S. PATENT DOCUMENTS 5,901,806 A * 5/1999 Takahashi ................. B60T 7/22
180/170
2012/0158243 A1* 6/2012 Pupin .................. B62D 15/0295
701/36

(Continued)

FOREIGN PATENT DOCUMENTS

CN    101553377 A    10/2009
CN    103796893 A    5/2014
(Continued)

*Primary Examiner* — Edwin A Young
(74) *Attorney, Agent, or Firm* — ScienBiziP, P.C.

(57) ABSTRACT

Disclosed is a bidirectional transmission control system for a vehicle. A road surface recognition apparatus collects an image of a road surface on which a vehicle drives currently, and forwards, after recognizing the type of the road surface on which the vehicle drives currently according to the image of the road surface, a corresponding first terrain mode request signal to an all-terrain controller through a signal transfer apparatus, so as to start a corresponding terrain mode in an all-terrain adaptive mode. In addition, the all-terrain controller forwards execution information about
(Continued)

the terrain mode to the road surface recognition apparatus through the signal transfer apparatus, so as to implement state feedback of the terrain mode currently executed. The inconsistency of information transmission rates between an all-terrain control system of a vehicle and an input system can be coordinated, thereby aiding in real-time switching of various terrain modes.

13 Claims, 3 Drawing Sheets (51) Int. Cl.
*B60W 10/14* (2012.01)
*B60W 10/18* (2012.01)
*B60W 40/06* (2012.01)

(52) U.S. Cl.
CPC ............ *B60W 10/18* (2013.01); *B60W 40/06* (2013.01); *B60W 2420/42* (2013.01); *B60W 2552/05* (2020.02); *B60W 2710/0666* (2013.01); *B60W 2710/0677* (2013.01); *B60W 2710/105* (2013.01); *B60W 2710/18* (2013.01)

(58) Field of Classification Search
CPC .............. B60W 30/182; B60W 40/06; B60W 2420/42; B60W 2552/05; B60W 2710/0666; B60W 2710/0677; B60W 2710/105; B60W 2710/18

See application file for complete search history.

(56) References Cited

U.S. PATENT DOCUMENTS

| 2016/0001780 A1* | 1/2016 | Lee ........................ B60R 1/00 701/48 |
| 2017/0001646 A1* | 1/2017 | Cooke .................. B60W 10/18 |
| 2020/0241563 A1* | 7/2020 | Van Der Knaap ....... G08G 1/22 |

FOREIGN PATENT DOCUMENTS

| CN | 104057954 A | 9/2014 |
| CN | 104125906 A | 10/2014 |
| CN | 105270263 A | 1/2016 |
| CN | 105683016 A | 6/2016 |
| CN | 106232449 A | 12/2016 |
| CN | 107150687 A | 9/2017 |
| GB | 2502802 A | 12/2013 |
| GB | 201520482 | 1/2016 |
| GB | 2537884 A | 11/2016 |
| WO | 2016079190 A1 | 5/2016 |

\* cited by examiner

Fig. 5

BIDIRECTIONAL TRANSMISSION CONTROL SYSTEM FOR VEHICLE

TECHNICAL FIELD

The present disclosure relates to the technical field of vehicle control, and more particularly to a bidirectional transmission control system for a vehicle.

BACKGROUND

An all-terrain adaptive mode is a vehicle control mode proposed in recent years, generally applied to off-road vehicles, and mainly implemented by a dedicated all-terrain controller. In the all-terrain adaptive mode, a variety of gear settings are generally provided, such as common, grass-gravel-snow, mud and rutting, sand, and rock modes. The all-terrain controller controls specific adjustment on an engine, a brake system and a vehicle suspension in different modes by the cooperation of an engine control system and an Electronic Stability Program (ESP) system, so as to improve the performance.

Since the all-terrain adaptive mode belongs to the emerging technology and involves the cooperation of various control systems in the vehicle, the signal transmission rates of different systems are different, so the overall compatibility is not satisfactory, and the terrain adaptation effect needs to be improved currently.

SUMMARY

In view of this, the embodiments of the present disclosure provide a bidirectional transmission control system for a vehicle, capable of coordinating the inconsistency of information transmission rates between an all-terrain control system of a vehicle and an input system.

The embodiment of the present disclosure provides a bidirectional transmission control system for a vehicle, which may include: a road surface recognition apparatus, a signal transfer apparatus and an all-terrain controller.

The road surface recognition apparatus is configured to collect an image of a road surface on which a vehicle drives currently, recognize the type of the road surface on which the vehicle drives currently according to the image of the road surface, and send a first terrain mode request signal corresponding to the current type of the road surface.

The signal transfer apparatus is configured to receive the first terrain mode request signal sent by the road surface recognition apparatus, and forward the first terrain mode request signal to the all-terrain controller.

The all-terrain controller is configured to start a corresponding terrain mode in an all-terrain adaptive mode according to the first terrain mode request signal, and send first execution information about the terrain mode corresponding to the first terrain mode request signal to the signal transfer apparatus, the terrain mode in the all-terrain adaptive mode including at least two of a common terrain mode, a snow mode, a mud mode, and a sand mode.

The signal transfer apparatus is further configured to forward the first execution information to the road surface recognition apparatus.

According to the above embodiment, on the one hand, a road surface recognition apparatus collects an image of a road surface on which a vehicle drives currently in real time, and forwards, after recognizing the type of the road surface on which the vehicle drives currently according to the image of the road surface, a corresponding first terrain mode request signal to an all-terrain controller through a signal transfer apparatus, so as to start a corresponding terrain mode in an all-terrain adaptive mode. On the other hand, the all-terrain controller forwards execution information about the terrain mode to the road surface recognition apparatus through the signal transfer apparatus, so as to implement state feedback of the terrain mode currently executed, thereby effectively coordinating the inconsistency of information transmission rates between an all-terrain control system of a vehicle and an input system, which aids in real-time switching of various terrain modes.

DETAILED DESCRIPTION OF THE EMBODIMENTS

In order to make the purposes, technical solutions and advantages of the present disclosure clearer, the present disclosure will be further described in detail below with reference to the accompanying drawings and embodiments. It is to be understood that the specific embodiments described herein are merely illustrative of the present disclosure and are not intended to limit the present disclosure.

Figure 1:
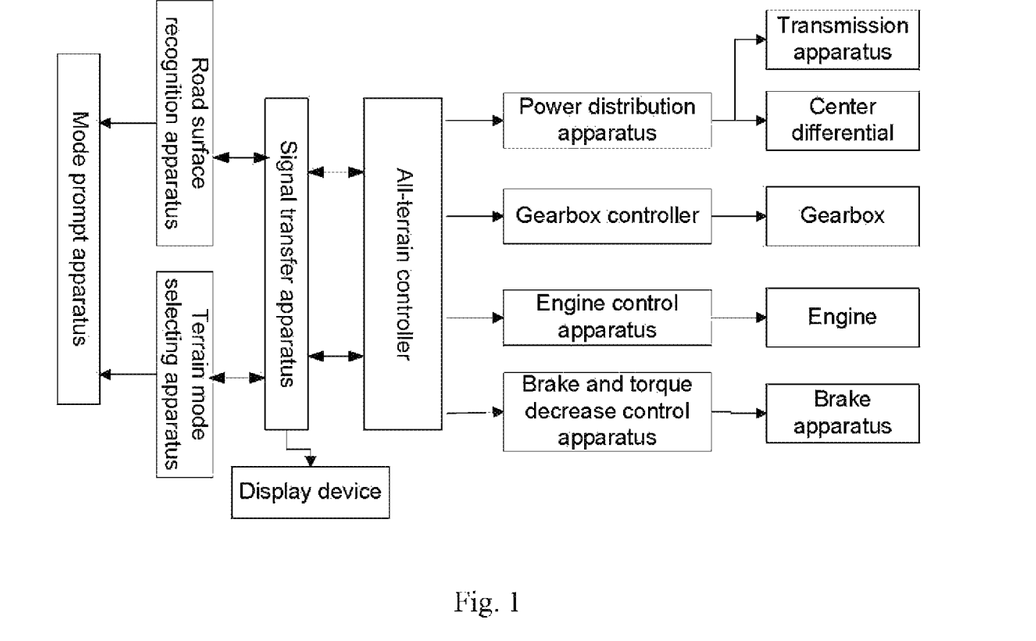
FIG. 1 is a schematic structure diagram of a bidirectional transmission control system for a vehicle according to an embodiment.

As shown in FIG. 1, it is a schematic structure diagram of a bidirectional transmission control system for a vehicle according to an embodiment. The bidirectional transmission control system for a vehicle includes a road surface recognition apparatus, a signal transfer apparatus and an all-terrain controller. The road surface recognition apparatus is communicatively connected to the all-terrain controller through the signal transfer apparatus. Various parts are described as follows:

The road surface recognition apparatus is configured to collect an image of a road surface on which a vehicle drives currently, recognize the type of the road surface on which the vehicle drives currently according to the image of the road surface, and send a first terrain mode request signal corresponding to the current type of the road surface to the signal transfer apparatus.

The signal transfer apparatus is configured to receive the first terrain mode request signal, and forward the first terrain mode request signal to the all-terrain controller.

The all-terrain controller is configured to start a corresponding terrain mode in an all-terrain adaptive mode according to the first terrain mode request signal, and feed back first execution information about the terrain mode corresponding to the first terrain mode request signal to the signal transfer apparatus.

The signal transfer apparatus is further configured to forward the first execution information to the road surface recognition apparatus. The signal transmission rate conversion between an all-terrain control system and a terrain input system is realized through the signal transfer apparatus, which is beneficial to system compatibility and flexible expansion of the system structure.

In an embodiment, the road surface recognition apparatus collects an image of a road surface on which a vehicle drives currently in real time or periodically. Due to different information such as color, pixel and/or contrast of different road surface images, the state of the current road surface can be effectively recognized on the basis of an image analysis algorithm, that is, according to the road surface image, the current road surface can be recognized as a common road surface (including a common urban road surface and a common high-speed road surface), a snowy road surface, a wading road surface or sand (or gravel, etc.). Alternatively, the type of the road surface recognized according to the image of the road surface includes at least two of a common type, a snow type, a mud type, and a sand type. For example, when the road surface recognition apparatus recognizes that the current type of the road surface is sand, a request signal is sent to the signal transfer apparatus, the requested target mode included in the request signal being the sand mode.

Preferably, a preset terrain mode in the all-terrain adaptive mode of the vehicle includes at least two of a common terrain mode, a snow mode, a mud mode, and a sand mode. It will be appreciated that the correspondence between various terrain modes in the all-terrain adaptive mode and the types of road surfaces may be pre-established through a corresponding setting module. The correspondence between the types of road surfaces and various terrain modes in the all-terrain adaptive mode may be a one-to-one correspondence, or multiple types of road surfaces correspond to one terrain mode, which is flexibly set according to actual situations.

It will be appreciated that the all-terrain adaptive mode can be opened or closed. The bidirectional transmission control system of the present embodiment is mainly used for achieving bidirectional signal transmission control between an input system such as the road surface recognition apparatus and an all-terrain control system when the all-terrain adaptive mode of the vehicle is opened.

Through the bidirectional transmission control system of the above embodiment, under the situation of inconsistency of network speeds of the input system such as the road surface recognition apparatus and the all-terrain control system, the problem of inconsistency of information sending speeds between the input system and the all-terrain control system can also be coordinated by the signal transfer apparatus, thereby preventing signal loss between the input system and the all-terrain control system, improving the driving safety, and ensuring that the vehicle can be automatically adjusted to the optimal state when driving in various terrains.

In an embodiment, the road surface recognition apparatus may specifically include: an image collection device, a positioning device and a processor. The image collection device is, for example, a camera, configured to collect an image of a road surface on which a vehicle drives currently in real time or periodically, and send the image of the road surface to the processor; the positioning device is, for example, a GPS or a Big Dipper positioning system, configured to acquire current geographic location information of the vehicle in real time or periodically, and send the geographic location information to the processor; and the processor is configured to analyze the image of the road surface to obtain road surface state information, determine a terrain of the current location of the vehicle according to the geographic location information, recognize the type of the road surface on which the vehicle drives currently in conjunction with the terrain and the road surface state information, and send a first terrain mode request signal corresponding to the current type of the road surface.

For example, the image of the current road surface is captured by the image collection device, and the current location is positioned by the positioning device according to a GPS or a Plough Satellite Positioning System. For example, the current road surface of Hobq Desert may be determined as a sand road surface more accurately in conjunction with the road surface image information captured by the road surface recognition apparatus, thereby improving the accuracy of road surface type recognition.

In another embodiment, as shown in FIG. 1, the bidirectional transmission control system for a vehicle may further include: a terrain mode selecting apparatus, configured to receive an operation instruction for selecting a terrain mode. That is, a user may manually select a terrain mode through the terrain mode selecting apparatus. The terrain mode selecting apparatus communicates with the all-terrain controller through the signal transfer apparatus. It will be appreciated that the terrain mode selecting apparatus also belongs to an input system with respect to the all-terrain controller of the vehicle.

The terrain mode selecting apparatus is configured to receive an operation instruction for selecting a terrain mode by a user, and send a corresponding second terrain mode request signal to the signal transfer apparatus according to the operation instruction. The second terrain mode request signal includes a terrain mode selected by the user. For example, if the user selects the sand mode through a corresponding button or control, the terrain mode selecting apparatus sends a request signal to the signal transfer apparatus, the currently requested terrain mode included in the request signal being the sand mode.

Correspondingly, the signal transfer apparatus is further configured to receive the second terrain mode request signal, and forward the second terrain mode request signal to the all-terrain controller.

Correspondingly, the all-terrain controller is further configured to start, when receiving the second terrain mode request signal, a terrain mode corresponding to the second terrain mode request signal, and feed back second execution information about the second terrain mode request signal to the signal transfer apparatus. Execution information of successfully starting the requested terrain mode or execution information of unsuccessfully starting the requested terrain mode is included.

Correspondingly, the signal transfer apparatus is further configured to forward the second execution information to the terrain mode selecting apparatus.

Therefore, the corresponding terrain mode can be automatically started by the road surface recognition apparatus, the corresponding terrain mode can be started based on the operation instruction of the user, and the problem of inconsistent information transmission rates between different input apparatuses (road surface recognition apparatus, terrain mode selecting apparatus, etc.) in the input system and the all-terrain controller is effectively overcome, thereby facilitating system expansion.

In an embodiment, the all-terrain controller is further configured to compare, when receiving the second terrain mode request signal, a terrain mode corresponding to the second terrain mode request signal with a terrain mode corresponding to the first terrain mode request signal, start, if the two are consistent, the terrain mode corresponding to the second terrain mode request signal, otherwise, start the terrain mode corresponding to the first terrain mode request signal. Execution information about the corresponding terrain mode is sent to the road surface recognition apparatus or the signal transfer apparatus. The misoperation of a driver or other people in the vehicle can be avoided accordingly.

In another embodiment, as shown in FIG. 1, the bidirectional transmission control system for a vehicle further includes: a mode indication apparatus, communicatively connected to the road surface recognition apparatus and the terrain mode selecting apparatus, and configured to prompt a terrain mode requested to be started by the road surface recognition apparatus or the terrain mode selecting apparatus.

The road surface recognition apparatus is further configured to send, when sending the corresponding first terrain mode request signal to the signal transfer apparatus, a first prompt request to the mode indication apparatus, the first prompt request enabling the mode indication apparatus to output corresponding prompt information to prompt a terrain mode requested by the first terrain mode request signal. For example, the mode indication apparatus turns on a control corresponding to the terrain mode, or outputs a prompt voice or the like.

The terrain mode selecting apparatus is further configured to send, when sending the corresponding second terrain mode request signal to the signal transfer apparatus, a second prompt request to the mode indication apparatus, the second prompt request enabling the mode indication apparatus to output corresponding prompt information to prompt a terrain mode requested by the second terrain mode request signal. For example, the mode indication apparatus turns on a control corresponding to the terrain mode, or outputs a prompt voice or the like.

In another embodiment, the road surface recognition apparatus is further configured to send, when receiving execution information about a terrain mode starting failure corresponding to the first terrain mode request signal and forwarded by the signal transfer apparatus, a third prompt request to the mode indication apparatus, the third prompt request enabling the mode indication apparatus to stop outputting corresponding prompt information to cancel the prompt for a terrain mode corresponding to the first terrain mode request signal. For example, the control corresponding to the terrain mode is turned off.

The terrain mode selecting apparatus is further configured to send, when receiving execution information about a terrain mode starting failure corresponding to the second terrain mode request signal and forwarded by the signal transfer apparatus, a fourth prompt request to the mode indication apparatus, the fourth prompt request enabling the mode indication apparatus to stop outputting corresponding prompt information to cancel the prompt for a terrain mode corresponding to the second terrain mode request signal. For example, the control corresponding to the terrain mode is turned off.

The execution information about the terrain mode fed back to the signal transfer apparatus by the all-terrain controller includes: successful starting information and unsuccessful starting information. Alternatively, the all-terrain controller feeds back the period of the execution information to the signal transfer apparatus, the period being more than twice the period in which the signal transfer apparatus forwards the execution information to the road surface recognition apparatus and the terrain mode selecting apparatus, thereby ensuring that the road surface recognition apparatus and the terrain mode selecting apparatus control the mode indication apparatus to perform corresponding prompt change according to the feedback execution information.

In an embodiment, the bidirectional transmission control system for a vehicle further includes an engine control apparatus, the all-terrain controller is further connected to the engine control apparatus, and the engine control apparatus is further connected to an engine.

The all-terrain controller is further configured to determine, after starting a corresponding terrain mode, a power output strategy corresponding to the current terrain mode according to a correspondence between terrain modes and preset power output strategies, and send the power output strategy to the engine control apparatus. Correspondingly, the engine control apparatus is configured to adjust an output torque of the engine according to a power output curve corresponding to the current power output strategy.

The power output curve is a function curve using a throttle position as a variable and the output torque of the engine as an output. For example, N=f(Throttle Position). N represents an output torque size of the engine, and Throttle Position represents the throttle position.

In an embodiment, it is also necessary to preset at least two power distribution strategies and establish a correspondence between various terrain modes in the all-terrain adaptive mode and the power output strategies. It is to be understood that each terrain mode and the power output strategies may have a one-to-one correspondence, or two or more terrain modes may correspond to one power output strategy. The correspondences may be set according to actual conditions.

Preferably, various power output strategies may be used for adjusting the output torque of the engine under different conditions by setting a corresponding control program in an engine control system and coordinating the corresponding systems/apparatuses through the control program, without adding a corresponding system module.

In an embodiment, a specific manner of adjusting an output torque size of the engine according to different power output curves under different power output strategies may be: acquiring the throttle position of the vehicle under different power distribution strategies, and calculating an output value of the corresponding power output curve by using the throttle position as an input parameter, that is, the output torque size of the engine. In different power output curves, the correspondence between the output torque size of the engine and the throttle position is different. In other words, under different power output strategies, even if the throttle position is the same, the output torque size of the engine is different, so power actually obtained by the vehicle is different. Therefore, the vehicle can drive on different road surfaces with a power adaptive to a current terrain, thereby ensuring that the vehicle can drive on different road surfaces at its best.

In an embodiment, the correspondence between various terrain modes in the all-terrain adaptive mode and power output strategies includes: one-to-one correspondence of a common terrain mode, a snow mode, a mud mode and a sand mode with a common output strategy, a first output strategy, a second output strategy and a third output strategy. The corresponding power output strategy can be seen in Table 1. It will be appreciated that the terrain mode in the all-terrain adaptive mode includes, but is not limited to, the above four types, and more different terrain modes, such as a rock mode and a grass mode, may be set according to actual conditions. Moreover, the correspondence between terrain modes in the all-terrain adaptive mode and power output strategies may also be set according to actual conditions, including but not limited to the above correspondence.

TABLE 1

| All-terrain adaptive mode | Common terrain mode/common output strategy | Adjust an output torque size of an engine according to a default power output curve |
|---|---|---|
| | Snow mode/first output strategy | Adjust an output torque size of an engine according to power output curve 1 |
| | Mud mode/second output strategy | Adjust an output torque size of an engine according to power output curve 2 |
| | Sand mode/third output strategy | Adjust an output torque size of an engine according to power output curve 3 |

Figure 2:
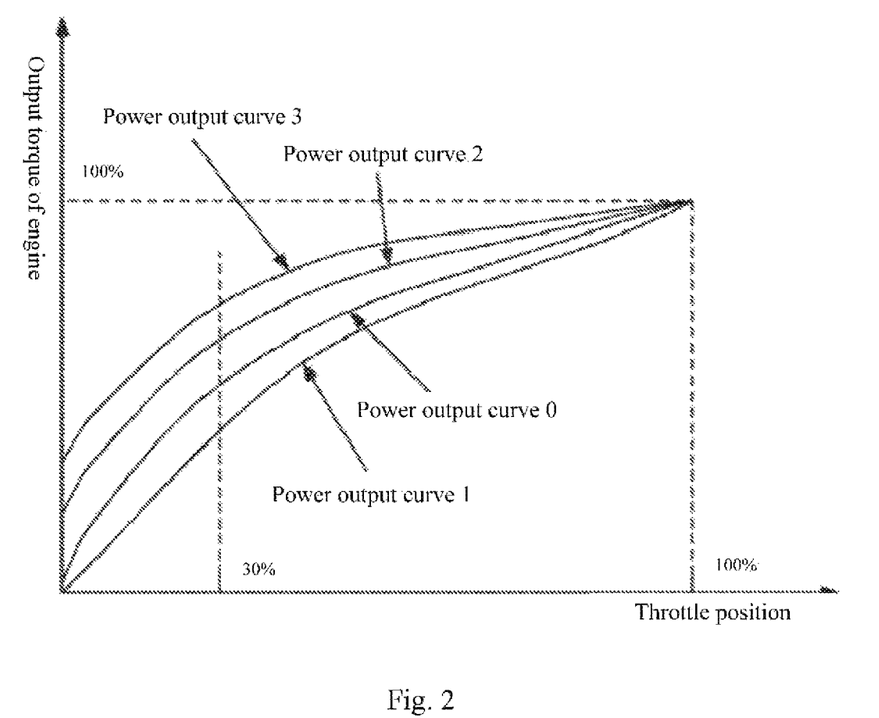
FIG. 2 is a sample diagram of different power output curves according to an embodiment.

As shown in FIG. 2, a default power output curve (power output curve 0), power output curve 1, power output curve 2, and power output curve 3 are function curves using a throttle position as a variable and an output torque size of the engine as an output. Alternatively, the function curve is a linear function curve, and the overall trend is that the torque output by the engine increases as the throttle position increases.

As shown in Table 1 and Table 2, the engine control apparatus can be specifically configured to:

detect, if it is the common output strategy, the throttle position, obtain an output torque size of the engine according to the current throttle position and a default power output curve, and control the engine to output a torque of the corresponding size, where there is no special requirement for the torque output of the engine in the common terrain mode, and the current vehicle engine torque output control strategy may be referred;

detect, if it is the first output strategy, the throttle position, obtain an output torque size of the engine according to the current throttle position and a first power output curve (i.e., power output curve 1), and control the engine to output a torque of the corresponding size, where as shown in FIG. 2, when the throttle position is the same, a torque corresponding to the first power output curve is smaller than a torque corresponding to the default power output curve, that is, in the snow mode, a low-sensitivity pedal curve is used to relatively reduce the engine output torque to prevent the vehicle from starting to slip;

detect, if it is the second output strategy, the throttle position, obtain an output torque size of the engine according to the current throttle position and a second power output curve (i.e., power output curve 2), and control the engine to output a torque of the corresponding size, where as shown in FIG. 2, when the throttle position is the same, a torque corresponding to the second power output curve is greater than a torque corresponding to the default power output curve, that is, in the mud mode, a high-sensitivity pedal curve is used, so that the engine output torque is stronger than the torque of the low-sensitivity pedal curve at the same throttle position to improve the vehicle power; and detect, if it is the third output strategy, the throttle position, obtain an output torque size of the engine according to the current throttle position and a third power output curve (i.e., power output curve 3), and control the engine to output a torque of the corresponding size, where as shown in FIG. 2, when the throttle position is the same, a torque corresponding to the third power output curve is greater than a torque corresponding to the second power output curve, that is, in the sand mode, a high-sensitivity pedal curve is used, so that the engine output torque is stronger than the torque in the mud mode at the same throttle position to provide a higher power for the vehicle.

It will be appreciated that when the all-terrain adaptive mode of the vehicle is started, the output torque of the engine is controlled in accordance with the manner of the above embodiment. Preferably, as shown in FIG. 2, the output torque size of the engine corresponding to each power output curve is expressed in terms of percentages relative to the current maximum output torque of the engine. When the throttle position is the same, a torque corresponding to the first power output curve is smaller than a torque corresponding to the default power output curve, a torque corresponding to the second power output curve is greater than the torque corresponding to the default power output curve, and a torque corresponding to the third power output curve is greater than the torque corresponding to the second power output curve.

In another embodiment, the above bidirectional transmission control system for a vehicle further includes a display device, and the display device is connected to the all-terrain controller through the signal transfer apparatus.

The all-terrain controller is further configured to send, when sending a power output strategy to the engine control apparatus, the currently determined power output strategy to the display device through the signal transfer apparatus. The display device is configured to display related information corresponding to the currently adopted power output strategy to remind the driver of the currently adopted power output strategy.

In another embodiment, the bidirectional transmission control system for a vehicle further includes a gearbox controller, the all-terrain controller is further communicatively connected to the gearbox controller, and the gearbox controller is further connected to a gearbox of the vehicle.

The all-terrain controller is further configured to determine, after starting a corresponding terrain mode, a power transmission strategy corresponding to the current terrain mode according to a correspondence between terrain modes and preset power transmission strategies, and send the power transmission strategy to the gearbox controller. Correspondingly, the gearbox controller is configured to control a gearbox of the vehicle to shift gears according to the current power transmission strategy to adjust a power transmission mechanism of the gearbox.

The gearbox is a mechanism for changing the speed and torque from the engine of the vehicle, which can change a transmission ratio of an output shaft to an input shaft by fixed or split gear, and also known as a transmission. The gearbox consists of a transmission mechanism and an operating mechanism. Most of the transmission mechanisms are driven by ordinary gears, and some are driven by planetary gears. Ordinary gear transmission shifting mechanisms generally use a slip gear and a synchronizer. The main function of the transmission mechanism is to change the value and direction of the torque and speed; the main function of the operating mechanism is to control the transmission mechanism to achieve the conversion of the transmission ratio, that is, to achieve gear shift, in order to achieve the purpose of variable speed and torque. In other words, the process of completing conversion of the transmission ratio by the gearbox is called gear shift, and according to different gear shift strategies, the gearbox achieves different speed and torque transfer.

It will be appreciated that various power transmission strategies may also be preset through a corresponding setting module, and the correspondence between terrain modes and power transmission strategies may be established. It will be appreciated that terrain modes and power transmission strategies may have a one-to-one correspondence, or more terrain modes may correspond to one power transmission strategy, which may be set according to actual situations. Preferably, terrain modes and power transmission strategies have a one-to-one correspondence.

The power transmission strategy is also called a gear shift strategy. The gear shift strategy includes switching from a higher gear to a lower gear, as well as switching from a lower gear to a higher gear. Normally, the relationship between power, speed and torque output by the engine is P=T*n. That is, in the case where the engine output power P is constant, the torque T is inversely proportional to the speed n, and as gear shift is performed earlier, the allowable speed n is lower, and the torque T is larger; conversely, as gear shift is performed later, the allowable speed n is higher, and the torque T is smaller. It is to be noted that in the embodiment of the present disclosure, an upshift strategy is taken as an example to illustrate the gear shift mode in different terrain modes. Those skilled in the art should understand that based on the principle corresponding to upshift and downshift, corresponding downshift control can be achieved. For example, downshift of the gearbox is triggered in conjunction with the current vehicle speed and a brake position.

Under the common power transmission strategy, the gearbox is controlled in a conventional manner to shift gears. For example, when the speed rises to the set default upshift speed value and the throttle position reaches the set depth value, the upshift is performed. Under other power transmission strategies, the conditions for the gearbox to shift gears are different. Moreover, it will be appreciated that under the same power transmission strategy, switching between different gears corresponds to different upshift speed values. For example, the upshift speed value corresponding to switching from gear 2 to gear 3 is lower than the upshift speed value corresponding to switching from gear 3 to gear 4. It will be appreciated that the above early gear shift and delayed gear shift refer to the earliness and lateness of a gear shift point when the vehicle is switched between the same gears (for example, gear 2 to gear 3), and gear shift points switched between different gears are not comparable.

In an embodiment, under different power transmission strategies, that is, a specific manner of controlling the gearbox of the vehicle to shift gears according to different gear shift strategies to adjust the power transmission mechanism of the gearbox may be: under different power transmission strategies, detecting a throttle position of the vehicle and a current vehicle speed, and triggering the gearbox to shift gears by using different combinations of the throttle position and the vehicle speed as trigger conditions. In different combinations of the throttle position and the vehicle speed, the vehicle speed requirements are different, and the throttle positions may be different or the same. Therefore, for different power transmission strategies, even if the throttle position is the same, gear shift may be executed at different times sooner or later, so the actual torque and speed of the vehicle will be different. Compared with the common gear shift strategy, if the gear is shifted in advance, the torque output is reduced, especially when the vehicle starts, the vehicle can be prevented from slipping; if gear shift is delayed, that is, when the speed is relatively high, gear shift is performed, so a wider range of torque output is allowed.

In an embodiment, the correspondence between various terrain modes in the all-terrain adaptive mode and power transmission strategies includes: one-to-one correspondence of a common terrain mode, a snow mode, a mud mode and a sand mode with a common power transmission strategy, a first power transmission strategy, a second power transmission strategy and a third power transmission strategy. The specific setting of the power transmission strategy is as shown in Table 2.

TABLE 2

| All-terrain adaptive mode | Common terrain mode/default power transmission strategy | Default gear shift strategy |
|---|---|---|
| | Snow mode/first power transmission strategy | Shift gears earlier |
| | Mud mode/second power transmission strategy | Delay gear shift |
| | Sand mode/third power transmission strategy | Further delay gear shift |

In the common terrain mode (common urban road or highway), a throttle position and a current vehicle speed are acquired, and a gear shift request is sent to a gearbox control unit when the throttle position and the vehicle speed satisfy a default combination condition, so as to switch the gearbox to a higher gear of the current gear. It will be appreciated that the main principle of the default gear shift strategy is to avoid dragging.

Figure 3:
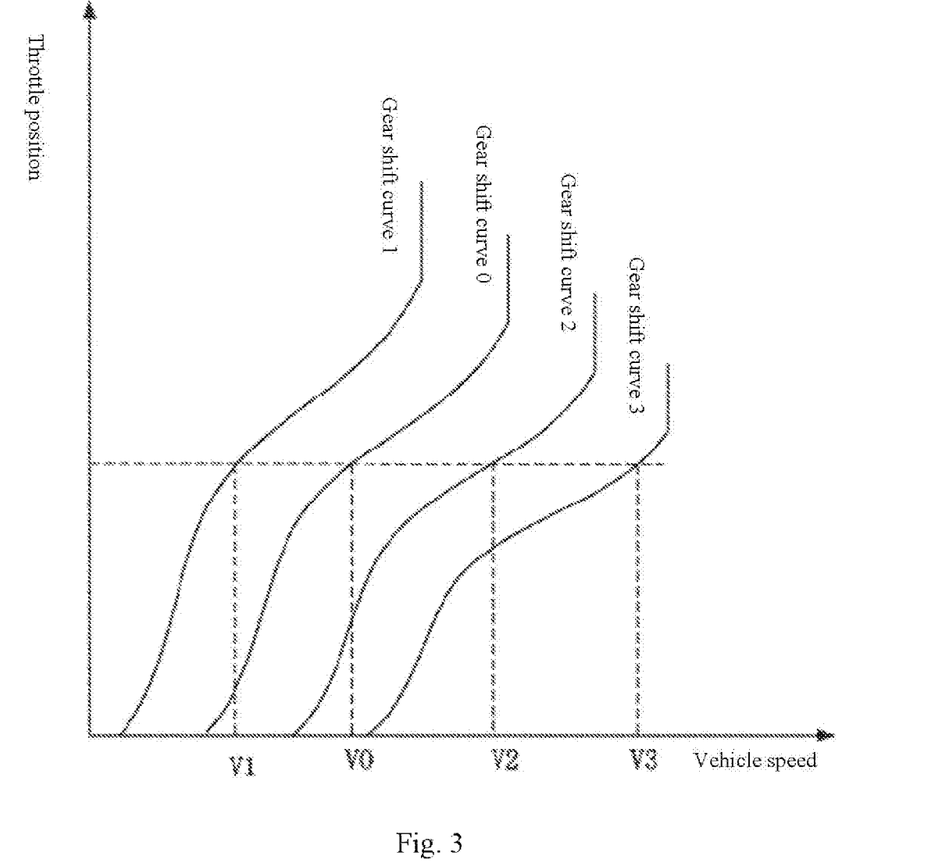
FIG. 3 is a sample diagram of different gear shift curves according to an embodiment.

Corresponding to Table 2, the gear shift curve corresponding to each terrain mode is shown in FIG. 3, that is, when driving in the common terrain mode/snow mode/mud mode/sand mode, the gearbox is controlled to shift gears according to gear shift curve 0, gear shift curve 1, gear shift curve 2 and gear shift curve 3 respectively. It will be appreciated that the gear shift curves in the present embodiment refer to gear shift curves when the vehicle is switched between the same gears (for example, gear 2 to gear 3).

In an embodiment, as shown in Table 2 and Table 3, the gearbox controller is specifically configured to:

acquire, if it is the common power transmission strategy, a throttle position and a current vehicle speed, and send a gear shift request to a gearbox control unit when the throttle position and the vehicle speed satisfy a default combination condition, so as to switch the gearbox to a higher gear of the current gear, where it will be appreciated that the main principle of the strategy is to avoid dragging;

acquire, if it is the first power transmission strategy, a throttle position and a current vehicle speed, and send a gear shift request to a gearbox control unit when the throttle position and the vehicle speed satisfy a first combination condition, so as to switch the gearbox to a higher gear of the current gear, the vehicle speed V1 requirement in the first combination condition being less than the vehicle speed V0 requirement in the default combination condition, where gears are shifted in advance when driving on snowy roads, especially in the initial stage, upshift can be quickly performed to prevent the vehicle from slipping;

acquire, if it is the second power transmission strategy, a throttle position and a current vehicle speed, and send a gear shift request to a gearbox control unit when the throttle position and the vehicle speed satisfy a second combination condition, so as to switch the gearbox to a higher gear of the current gear, the vehicle speed V2 requirement in the second combination condition being greater than the vehicle speed V0 requirement in the default combination condition, where gear shift is delayed when driving on muddy roads, that is, gears are shifted when the speed is relatively high (relative to the common terrain mode), and a wider range of torque output is allowed to prevent the wheels from getting muddy; and acquire, if it is the third power transmission strategy, a throttle position and a current vehicle speed, and send a gear shift request to a gearbox control unit when the throttle position and the vehicle speed satisfy a third combination condition, so as to switch the gearbox to a higher gear of the current gear, the vehicle speed V3 requirement in the third combination condition being greater than the vehicle speed V2 requirement in the second combination condition, where gear shift is further delayed when driving on sandy roads, that is, gears are shifted when the speed is relatively high (relative to the common terrain mode), and a wider range of torque output is allowed to prevent the wheels from falling into the sand.

It will be appreciated that if downshift is required, the gear shift request includes downshift information. The gearbox controller controls the gearbox to switch to the corresponding gear according to the upshift information or the downshift information in the received gear shift request in conjunction with the current gear of the gearbox.

In an embodiment, the display device is further configured to display prompt information corresponding to the current power transmission strategy to remind the driver of the currently adopted power transmission strategy. The all-terrain controller further sends, when sending a power transmission strategy to the gearbox controller, the currently determined power transmission strategy to the display device through the signal transfer apparatus. The display device is configured to display information related to the currently adopted power transmission strategy. For example, the corresponding power transmission strategy may be output through an instrument panel of the vehicle.

In an embodiment, the bidirectional transmission control system for a vehicle further includes a power distribution apparatus. The all-terrain controller is also connected to the power distribution apparatus. The power distribution apparatus is also connected to a center differential of the vehicle.

The all-terrain controller is further configured to determine, after starting a corresponding terrain mode, a power distribution strategy corresponding to the current terrain mode according to a correspondence between terrain modes and preset power distribution strategies, and send the power distribution strategy to the power distribution apparatus. Correspondingly, the power distribution apparatus is configured to control the center differential of the vehicle to switch to a corresponding locking mode according to the current power distribution strategy, and distribute torques to front and rear axles of the vehicle according to a torque distribution curve corresponding to the current power distribution strategy.

The torque distribution curve is a function curve using a throttle position as a variable and a torque proportion of a driven axle as an output. For example, T=f (Throttle Position). T represents the obtained torque proportion of the driven axle (i.e., the proportion of the driven axle to the total output); and Throttle Position represents the throttle position.

The center differential means that for a multi-axis drive (for example, four-wheel drive) vehicle, the drive axles are connected by a drive shaft, so that each drive axle may have different input angular velocities to eliminate the sliding of the axle drive wheels, and the center differential is mounted between the drive axles. In particular, for the four-wheel drive vehicle, the center differential is a differential disposed between the front and rear axles, and its function is to allow the front and rear axles to rotate at different speeds while transmitting power to the front and rear axles. Front and rear wheels are driven in an unequal distance in the form of pure rolling as much as possible to reduce the friction between the tires and the ground. The center differential may be any one of a common center differential, a multi-plate clutch type center differential, a Torsen type center differential, and a viscous coupling type center differential.

It will be appreciated that it is also necessary to preset at least two power distribution strategies by a corresponding setting module and establish a correspondence between various terrain modes in the all-terrain adaptive mode and the power distribution strategies. Various terrain modes and the power transmission strategies may have a one-to-one correspondence, or two or more terrain modes may correspond to one power distribution strategy, which may be set according to actual situations.

Further, a correspondence between a power distribution strategy and the locking mode of the center differential is also established by a corresponding setting module. In different locking modes of the center differential, the maximum share of the torque of the driven axle is different in the total output torque. Alternatively, the locking mode of the center differential includes at least two of a smart control mode, a smart locking mode and a full locking mode. In the smart control mode, the locking degree of the center differential on the front and rear axles is adjusted timely according to the current driving situation, that is, in this mode, the locking degree of the front and rear axles is not fixed, but may change in real time. Differently, the smart locking mode refers to maintaining the center differential at a set locking degree that is less than the maximum locking degree of the center differential on the front and rear axles. In the full locking mode, the center differential maintains the maximum locking degree on the front and rear axles. It is assumed that it is a four-wheel drive vehicle dominated by a front drive. The maximum locking degree of the center differential on the front and rear axles is 100%. When the throttle position is maximal (i.e., a throttle is fully open), the torque distribution of the front and rear axles is 50% and 50%. For example, in the smart locking mode, the locking degree of the front and rear axles may be 50%, 70%, etc.; if the locking degree of the front and rear axles is 50%, the maximum torque distribution proportion of the front and rear axles may be 75%: 25%; and if the locking degree of the front and rear axles is 70%, the torque distribution proportion of the front and rear axles may be 65%: 35%. It can be seen that for the four-wheel drive vehicle dominated by a front drive, as the locking degree of the center differential on the front and rear axles is higher, the maximum torque obtained by the rear axle is greater, and vice versa, the maximum torque obtained by the rear axle is smaller. Since the torque obtained by the whole vehicle is equal to the sum of the front axle torque and the rear axle torque, the front wheel (drive wheel) is easy to slip when driving on the road surface to which a system disclosure is attached such as mud, sand and snow. The slipping part is the wasted torque. By switching the center differential to the corresponding locking mode, more torque can be distributed to the rear axle when the front wheels are slipping, so as to decrease the torque wasted by the slip, and the drive torque provided for the whole vehicle is increased.

Preferably, various power distribution strategies may be used for distributing the output torque of the engine under different conditions by setting a corresponding control program in the existing power distribution system of the vehicle and coordinating the corresponding systems/apparatuses through the control program, without adding a corresponding control system. The vehicle can drive on different road surfaces with a four-wheel drive power adaptive to a current terrain, thereby ensuring that the vehicle can drive on different road surfaces at its best.

In an alternative embodiment, the correspondence between various terrain modes in the all-terrain adaptive mode and power distribution strategies includes: one-to-one correspondence of a common terrain mode, a snow mode, a mud mode and a sand mode with a common distribution strategy, a first distribution strategy, a second distribution strategy and a third distribution strategy. The corresponding power distribution strategy can be seen in Table 3. It will be appreciated that the terrain mode in the all-terrain adaptive mode includes, but is not limited to, the above four types, and more different terrain modes, such as a rock mode and a grass mode, may be set according to actual conditions. Moreover, the correspondence between terrain modes in the all-terrain adaptive mode and power distribution strategies may also be set according to actual conditions, including but not limited to the above correspondence.

TABLE 3

| All-terrain adaptive mode | Common terrain mode/first distribution strategy | Distribute, in a smart control mode of a center differential, torques to front and rear axles of a vehicle according to torque distribution curve 1 |
|---|---|---|
| | Snow mode/second distribution strategy | Distribute, in a smart locking mode of a center differential, torques to front and rear axles of a vehicle according to torque distribution curve 2 |
| | Mud mode/third distribution strategy | Distribute, in a full locking mode of a center differential, torques to front and rear axles of a vehicle according to torque distribution curve 3 |

Figure 4:
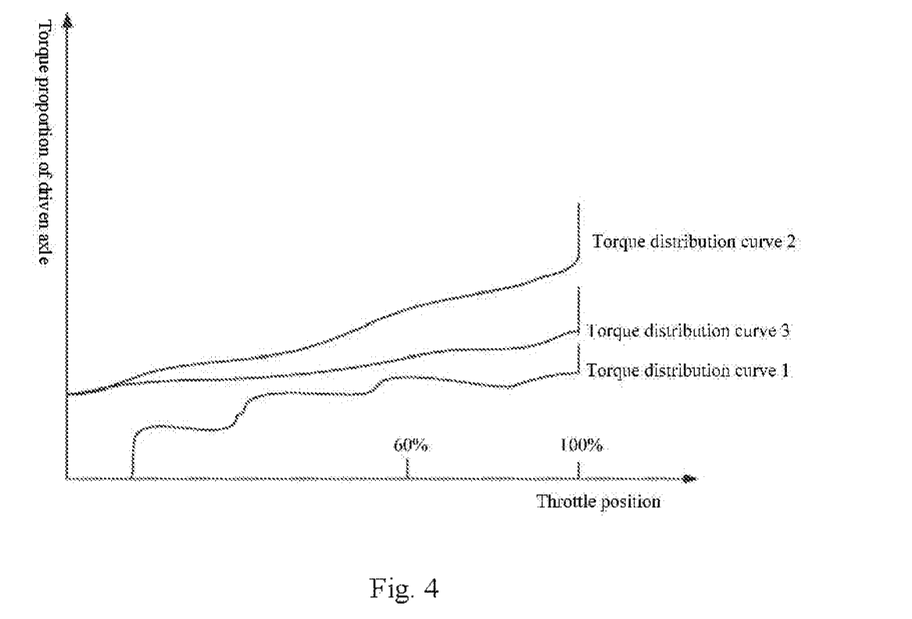
FIG. 4 is a sample diagram of different power distribution curves according to an embodiment.

As shown in FIG. 4, torque distribution curve 1, torque distribution curve 2 and torque distribution curve 3 are linear function curves, and the overall trend is that the torque proportion of the driven axle increases as the increase of the throttle position. Preferably, when the throttle position is smaller than a certain degree (for example, 60%, the value may be different for different torque distribution curves), the torque proportion variation corresponding to the driven axle is small, and when the throttle position is greater than or equal to a certain degree (for example, 80%), the torque proportion corresponding to the driven axle will vary significantly.

As shown in Table 3 and Table 4, alternatively, the power distribution apparatus is specifically configured to perform the following operations:

If it is the common distribution strategy, the center differential of the vehicle is controlled to switch to a smart control mode, the locking degree of the center differential is adjusted in the smart control mode timely, a throttle position is acquired, a first torque proportion corresponding to a driven axle is determined according to the throttle position and a first torque distribution curve (torque distribution curve 1), and torques are distributed to front and rear axles of the vehicle according to the first torque proportion. When the center differential is in the smart control mode, the locking degree of the center differential can be controlled timely. In addition, under the common distribution strategy, the power distribution apparatus further acquires a throttle position in real time, determines a first torque proportion corresponding to a driven axle according to the throttle position and torque distribution curve 1, and distributes torques to front and rear axles of the vehicle according to the first torque proportion. If the vehicle is dominated by a front drive, the driven axle is a rear axle; and if the vehicle is dominated by a rear drive, the driven axle is a front axle. The sum of the respective torque proportions of the front and rear axles of the vehicle is 100%. It will be appreciated that compared with the current torque distribution manner of the four-wheel drive vehicle, there is no special requirement for the torque distribution strategy in the common terrain mode.

If it is the first distribution strategy, the center differential of the vehicle is controlled to switch to a smart locking mode, the center differential is maintained at a set locking degree in the smart locking mode, a throttle position is acquired, a second torque proportion corresponding to a driven axle is determined according to the throttle position and a second torque distribution curve (torque distribution curve 2), and torques are distributed to front and rear axles of the vehicle according to the second torque proportion. In the smart locking mode of the center differential, the center differential may be maintained at a corresponding locking degree according to the current driving situation, and the locking degree is smaller than the maximum locking degree of the center differential. In addition, under the first distribution strategy, the power distribution apparatus further acquires a throttle position in real time, determines a second torque proportion corresponding to a driven axle according to the throttle position and torque distribution curve 2, and distributes torques to front and rear axles of the vehicle according to the second torque proportion. As shown in FIG. 4, under the equal throttle position, the second torque proportion is greater than the first torque proportion, that is, under the equal throttle position, a driven wheel obtains a torque in a greater proportion than the output torque of the engine.

If it is the second distribution strategy, the center differential of the vehicle is controlled to switch to a full locking mode, the center differential is maintained at a maximum locking degree in the full locking mode, a throttle position is acquired, a third torque proportion corresponding to a driven axle is determined according to the throttle position and a third torque distribution curve (torque distribution curve 3), and torques are distributed to front and rear axles of the vehicle according to the third torque proportion. In the full locking mode of the center differential, the center differential is maintained at the maximum locking degree. In addition, under the second distribution strategy, the power distribution apparatus further acquires a throttle position in real time, determines a third torque proportion corresponding to a driven axle according to the throttle position and torque distribution curve 3, and distributes torques to front and rear axles of the vehicle according to the third torque proportion. As shown in FIG. 4, under the equal throttle position, the third torque proportion is greater than the first torque proportion and smaller than or equal to the second torque proportion, that is, under the equal throttle position, more torque is distributed to the driven wheel compared with a common mode, but less torque is distributed compared with a snow mode.

It will be appreciated that the torque proportion of the driven axle corresponding to each torque distribution curve is relative to the current output torque of the engine (or gearbox), and can be expressed as a percentage specifically. The sum of the torque proportion of the driven axle and the torque proportion of the drive wheel is 100%.

In an embodiment, the display device is further configured to display information related to the currently adopted power distribution strategy to remind the driver of the currently adopted power distribution strategy. The all-terrain controller is further configured to send, when sending a power distribution strategy to the power distribution apparatus, the currently determined power distribution strategy to the display device through the signal transfer apparatus. The display device is configured to display information related to the currently adopted power distribution strategy. For example, the corresponding power distribution strategy may be output through an instrument panel of the vehicle.

In an embodiment, the bidirectional transmission control system for a vehicle further includes a brake and torque decrease control apparatus, the all-terrain controller being further communicatively connected to the brake and torque decrease control apparatus.

The all-terrain controller is further configured to determine, after starting a corresponding terrain mode, a brake/torque strategy corresponding to the current terrain mode according to a correspondence between terrain modes and preset brake/torque strategies, and send the brake/torque strategy to the brake and torque decrease control apparatus. Correspondingly, the brake and torque decrease control apparatus is configured to adjust an output torque of the engine according to the current brake/torque strategy, and perform corresponding brake control on wheels.

In an alternative embodiment, various brake/torque control strategies may also be preset through a corresponding setting module, and the correspondence between terrain modes and brake/torque control strategies may be established. Preferably, various brake/torque control strategies may implement different torque control strategies and different brake control strategies by setting a corresponding control program in the existing control system of the vehicle and coordinating the corresponding execution systems through the control program, without adding a corresponding control system.

Alternatively, in the common terrain mode, brake and torque controls are performed according to conventional strategies; brake and torque control strategies in other terrain modes are different from the conventional strategies. The brake control includes single-wheel brake or multiple-wheel brake, and the vehicle is applicable to different terrains through different torque control strategies and different brake control strategies. In particular, the four-wheel drive vehicle can drive on different road surfaces at its best.

Figure 5:
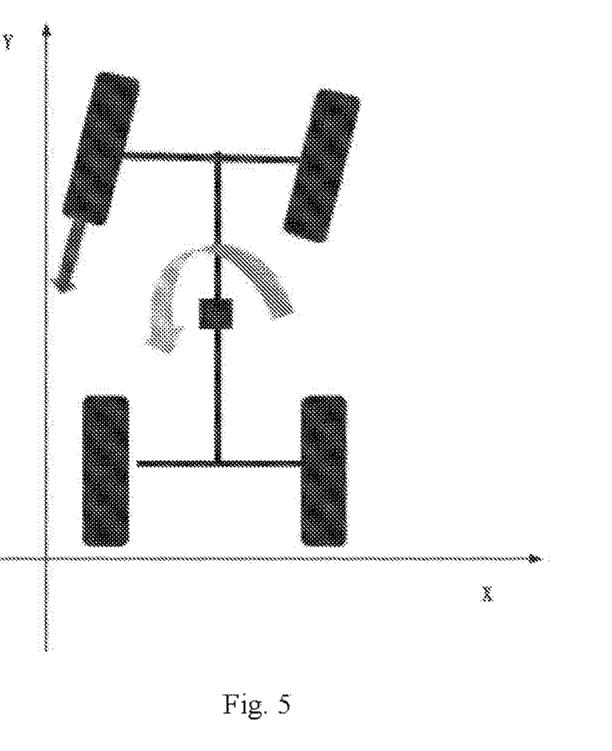
FIG. 5 is a sample diagram of brake and torque decrease control according to an embodiment.

In an embodiment, under different brake/torque control strategies, a specific manner of adjusting the output torque of the engine according to different torque control strategies and performing brake control on wheels according to different brake control strategies may be: detecting a front and rear axle speed difference of the vehicle under different brake/torque control strategies, and adjusting the output torque of the engine respectively when the front and rear axle speed difference reaches different values; and similarly, detecting a yaw angle of the vehicle under different brake/torque control strategies, and distributing a corresponding size of brake force to each wheel for brake respectively when the yaw angle reaches different angle values. In the case of the same front and rear axle speed difference, the brake and torque decrease control apparatus intervenes to request torque decrease at different times under different brake/torque control strategies, so the drive force obtained by the whole vehicle will also be different. As the brake and torque decrease control apparatus intervenes to request torque decrease earlier, the drive force obtained by the whole vehicle is smaller, which results in a smaller slip amount of the whole vehicle relative to an X direction; on the contrary, the drive force obtained by the whole vehicle is greater, which results in a greater slip amount of the whole vehicle relative to the X direction. Similarly, in the case of the same yaw angle of the vehicle, the apparatus intervenes to single-wheel or multi-wheel brake control at different times under different brake/torque control strategies, so the yawing amplitude tolerated by the whole vehicle will also be different. As the apparatus intervenes to single-wheel or multi-wheel brake control earlier, the yawing amplitude tolerated by the whole vehicle is smaller, which results in a smaller slip amount of the whole vehicle relative to a Y direction; on the contrary, the yawing amplitude tolerated by the whole vehicle is greater, which results in a greater slip amount of the whole vehicle relative to the Y direction. The X and Y directions refer to a coordinate system as shown in FIG. 5. As shown in FIG. 5, when the vehicle turns to the right, the rightward deflection with respect to the Y direction is liable to occur. If the deflection angle is excessive, a brake force is applied to a left front wheel, that is, single wheel brake is performed; from the horizontal plane, the brake force indicated by a straight arrow forms a counterclockwise torque along the center of mass of the vehicle, as indicated by a curved arrow in FIG. 5, the rightward deflection of the vehicle can be corrected under the action of the torque.

In an embodiment, the correspondence between various terrain modes in the all-terrain adaptive mode and brake/torque control strategies includes: one-to-one correspondence of a common terrain mode, a snow mode, a mud mode and a sand mode with a common brake/torque strategy, a first brake/torque strategy, a second brake/torque strategy and a third brake/torque strategy. A specific implementation strategy is as shown in Table 4.

TABLE 4

| Common terrain mode: common brake/torque strategy | Default torque decrease strategy | Default brake strategy |
|---|---|---|
| Snow mode: first brake/torque strategy | Perform torque decrease intervention when a front and rear axle speed difference reaches a first speed difference threshold | Perform brake intervention when a yaw angle reaches a set first yaw angle threshold |
| Mud mode: second brake/torque strategy | Perform torque decrease intervention when a front and rear axle speed difference reaches a second speed difference threshold | Perform brake intervention when a yaw angle reaches a set second yaw angle threshold |
| Sand mode: third brake/torque strategy | Perform torque decrease intervention when a front and rear axle speed difference reaches a third speed difference threshold | Perform brake intervention when a yaw angle reaches a set third yaw angle threshold |

A default torque decrease strategy refers to performing torque decrease intervention when the front and rear axle speed difference reaches a default speed difference threshold under normal situations. A default brake strategy refers to performing brake intervention when the yaw angle of the vehicle reaches a default yaw angle threshold under the normal situations.

Preferably, a first speed difference threshold is smaller than the default speed difference threshold, and a first yaw angle threshold is smaller than the default yaw angle threshold; a second speed difference threshold is greater than the default speed difference threshold, and a second yaw angle threshold is greater than the default yaw angle threshold; a second speed difference threshold is greater than the default speed difference threshold, and a second yaw angle threshold is greater than the default yaw angle threshold.

Referring to Table 4, the brake and torque decrease control apparatus is specifically configured to:

acquire, if it is the common brake/torque strategy, a front and rear axle speed difference of the vehicle, send a torque decrease request to the engine when the front and rear axle speed difference reaches a preset default speed difference threshold to decrease the output torque of the engine, acquire a yaw angle of the vehicle, and send, when the yaw angle reaches a set default yaw angle threshold, a brake request to a brake system to apply a corresponding size of brake force to each wheel;

acquire, if it is the first brake/torque strategy, a front and rear axle speed difference of the vehicle, send a torque decrease request to the engine when the front and rear axle speed difference reaches a first speed difference threshold to decrease the output torque of the engine, acquire a yaw angle of the vehicle, and send, when the yaw angle reaches a set first yaw angle threshold, a brake request to a brake system to apply a corresponding size of brake force to each wheel, the first speed difference threshold being smaller than the default speed difference threshold, and the first yaw angle threshold being smaller than the default yaw angle threshold, where when driving on snow, the vehicle obtains a smaller drive force to reduce the slip amount of the vehicle relative to the X direction, and the brake is intervened earlier to prevent the vehicle from shifting relative to the Y direction, that is, to prevent the vehicle from being out of control on a low attachment road surface;

acquire, if it is the second brake/torque strategy, a front and rear axle speed difference of the vehicle, send a torque decrease request to the engine when the front and rear axle speed difference reaches a second speed difference threshold to decrease the output torque of the engine, acquire a yaw angle of the vehicle, and send, when the yaw angle reaches a set second yaw angle threshold, a brake request to a brake system to apply a corresponding size of brake force to each wheel, the second speed difference threshold being greater than the default speed difference threshold, and the second yaw angle threshold being greater than the default yaw angle threshold, where when driving on a muddy road surface, the vehicle obtains a greater drive force to allow a certain slip amount of the vehicle relative to the X direction, and the vehicle is allowed to shift to a certain extent relative to the Y direction so as to prevent the vehicle from swinging frequently on the wet surface of the mud; and acquire, if it is the third brake/torque strategy, a front and rear axle speed difference of the vehicle, send a torque decrease request to the engine when the front and rear axle speed difference reaches a third speed difference threshold to decrease the output torque of the engine, acquire a yaw angle of the vehicle, and send, when the yaw angle reaches a set third yaw angle threshold, a brake request to a brake system to apply a corresponding size of brake force to each wheel, the third speed difference threshold being greater than the second speed difference threshold, and the third yaw angle threshold being greater than the second yaw angle threshold, where when driving on a sandy road surface, the vehicle obtains a greater drive force to allow a certain slip amount of the vehicle relative to the X direction, and the vehicle is allowed to shift to a certain extent relative to the Y direction, that is, the vehicle is allowed to swing laterally to a certain extent on the soft surface of the sand.

The torque decrease request includes a target torque value to adjust the output torque of the engine according to the target torque value, and the brake request includes brake force distribution information to apply a corresponding size of brake force to each wheel according to the brake force distribution information. Under any two brake/torque strategies, at least one of the target torque value included in the torque decrease request and the brake force distribution information included in the brake request is different.

In an embodiment, the brake and torque decrease control apparatus may be an ESP, and the ESP starts a torque decrease request to the engine control apparatus to adjust the output torque of the engine.

In an embodiment, the display device is further configured to display prompt information corresponding to the current brake/torque strategy to remind the driver of the currently adopted brake/torque strategy. The all-terrain controller is further configured to send, when sending a brake/torque strategy to the brake and torque decrease control apparatus, the currently determined brake/torque strategy to the display device through the signal transfer apparatus. The display device is configured to display information related to the currently adopted brake/torque strategy. For example, the corresponding brake/torque strategy may be output through an instrument panel of the vehicle.

By means of the bidirectional transmission control system for a vehicle of the above embodiments, on the one hand, the road surface recognition apparatus may automatically recognize the type of a road surface on which a vehicle drives currently, and forward a corresponding first terrain mode request signal to the all-terrain controller through the signal transfer apparatus to start a corresponding terrain mode in an all-terrain adaptive mode; and the terrain mode selecting apparatus may also receive an operation instruction of a user, and forward a corresponding second terrain mode request signal to the all-terrain controller through the signal transfer apparatus to start a corresponding terrain mode in the all-terrain adaptive mode. On the other hand, the all-terrain controller forwards execution information about the corresponding terrain mode to the road surface recognition apparatus or the terrain mode selecting apparatus through the signal transfer apparatus, so as to implement state feedback of the terrain mode currently executed. The inconsistency of information transmission rates between an all-terrain control system of a vehicle and each external input system is effectively coordinated, thereby aiding in real-time switching of various terrain modes. Furthermore, the engine control apparatus, the gearbox control apparatus, the power distribution apparatus and the brake and torque decrease control apparatus can be coordinated to start the corresponding control mechanism according to the current terrain mode, which is beneficial to smart adjustment of a vehicle on different road surfaces with a strategy suitable for the current terrain, thereby ensuring that the vehicle can drive on different road surfaces at its best.

In the above embodiments, descriptions of each embodiment are emphasized respectively, and parts which are not elaborated in detail in a certain embodiment may refer to relevant descriptions of other embodiments. It will be appreciated that the used terms "first", "second" and the like are used herein to distinguish objects, but these objects are not limited by these terms.

Those skilled in the art can understand that all or part of the processes in the above method embodiments may be implemented by a computer program to instruct related hardware, and the program may be stored in a computer readable storage medium as an independent product for sales or use. The program, when executed, may perform all or part of the steps of the embodiments of the methods described above. The storage medium may be a magnetic disk, an optical disk, a Read-Only Memory (ROM), or a Random Access Memory (RAM).

The above embodiments are merely illustrative of several implementation manners of the present disclosure and are not to be construed as limiting the patent scope of the present disclosure. It is to be noted that a number of variations and modifications may be made by those of ordinary skill in the art without departing from the conception of the present disclosure, and all fall within the scope of protection of the present disclosure. Therefore, the scope of protection of the present disclosure should be determined by the appended claims.

What is claimed is:

1. A bidirectional transmission control system for a vehicle, comprising: a road surface recognition apparatus, a signal transfer apparatus and an all-terrain controller, wherein
the road surface recognition apparatus is configured to collect an image of a road surface on which the vehicle drives currently, recognize a type of the road surface on which the vehicle drives currently according to the image of the road surface, and send a first terrain mode request signal corresponding to the current type of the road surface to the signal transfer apparatus;
the signal transfer apparatus is configured to receive the first terrain mode request signal, and forward the first terrain mode request signal to the all-terrain controller;
the all-terrain controller is configured to start a corresponding terrain mode in an all-terrain adaptive mode according to the first terrain mode request signal, and feed back first execution information about the terrain mode corresponding to the first terrain mode request signal to the signal transfer apparatus, the terrain mode in the all-terrain adaptive mode comprising at least two of a common terrain mode, a snow mode, a mud mode, and a sand mode; and
the signal transfer apparatus is further configured to forward the first execution information to the road surface recognition apparatus.

2. The system as claimed in claim 1, wherein the road surface recognition apparatus comprises: an image collection device, a positioning device and a processor;
the image collection device is configured to collect the image of the road surface on which the vehicle drives currently, and send the image of the road surface to the processor;
the positioning device is configured to acquire current geographic location information of the vehicle, and send the geographic location information to the processor; and
the processor is configured to analyze the image of the road surface to obtain road surface state information, determine a terrain of the current location of the vehicle according to the geographic location information, recognize the type of the road surface on which the vehicle drives currently in conjunction with the terrain and the road surface state information, and send the first terrain mode request signal corresponding to the current type of the road surface.

3. The system as claimed in claim 2, further comprising: an engine control apparatus, wherein
the all-terrain controller is further configured to determine, after starting a corresponding terrain mode, a power output strategy corresponding to the current terrain mode according to a correspondence between terrain modes and preset power output strategies, and send the power output strategy to the engine control apparatus;

the engine control apparatus is configured to adjust an output torque of an engine according to a power output curve corresponding to the current power output strategy, the power output curve being a function curve using a throttle position as a variable and the output torque of the engine as an output;
the correspondence between various terrain modes in the all-terrain adaptive mode and power output strategies comprises: one-to-one correspondence of the common terrain mode, the snow mode, the mud mode and the sand mode with a common output strategy, a first output strategy, a second output strategy and a third output strategy;
the engine control apparatus is specifically configured to:
detect, if it is the common output strategy, the throttle position, obtain an output torque size of the engine according to the current throttle position and a default power output curve, and control the engine to output a torque of the corresponding size;
detect, if it is the first output strategy, the throttle position, obtain an output torque size of the engine according to the current throttle position and a first power output curve, and control the engine to output a torque of the corresponding size;
detect, if it is the second output strategy, the throttle position, obtain an output torque size of the engine according to the current throttle position and a second power output curve, and control the engine to output a torque of the corresponding size; and
detect, if it is the third output strategy, the throttle position, obtain an output torque size of the engine according to the current throttle position and a third power output curve, and control the engine to output a torque of the corresponding size,
wherein when the throttle position is the same, a torque corresponding to the first power output curve is smaller than a torque corresponding to the default power output curve, a torque corresponding to the second power output curve is greater than the torque corresponding to the default power output curve, and a torque corresponding to the third power output curve is greater than the torque corresponding to the second power output curve.

4. The system as claimed in claim 1, further comprising: a terrain mode selecting apparatus, wherein
the terrain mode selecting apparatus is configured to receive an operation instruction for selecting a terrain mode, and send a corresponding second terrain mode request signal to the signal transfer apparatus according to the operation instruction;
the signal transfer apparatus is further configured to receive the second terrain mode request signal, and forward the second terrain mode request signal to the all-terrain controller;
the all-terrain controller is further configured to start, when receiving the second terrain mode request signal, a terrain mode corresponding to the second terrain mode request signal, and feed back second execution information about the second terrain mode request signal to the signal transfer apparatus; and
the signal transfer apparatus is further configured to forward the second execution information to the terrain mode selecting apparatus.

5. The system as claimed in claim 4, further comprising: an engine control apparatus, wherein
the all-terrain controller is further configured to determine, after starting a corresponding terrain mode, a power output strategy corresponding to the current terrain mode according to a correspondence between terrain modes and preset power output strategies, and send the power output strategy to the engine control apparatus;

the engine control apparatus is configured to adjust an output torque of an engine according to a power output curve corresponding to the current power output strategy, the power output curve being a function curve using a throttle position as a variable and the output torque of the engine as an output;

the correspondence between various terrain modes in the all-terrain adaptive mode and power output strategies comprises: one-to-one correspondence of the common terrain mode, the snow mode, the mud mode and the sand mode with a common output strategy, a first output strategy, a second output strategy and a third output strategy;

the engine control apparatus is specifically configured to:

detect, if it is the common output strategy, the throttle position, obtain an output torque size of the engine according to the current throttle position and a default power output curve, and control the engine to output a torque of the corresponding size;

detect, if it is the first output strategy, the throttle position, obtain an output torque size of the engine according to the current throttle position and a first power output curve, and control the engine to output a torque of the corresponding size;

detect, if it is the second output strategy, the throttle position, obtain an output torque size of the engine according to the current throttle position and a second power output curve, and control the engine to output a torque of the corresponding size; and detect, if it is the third output strategy, the throttle position, obtain an output torque size of the engine according to the current throttle position and a third power output curve, and control the engine to output a torque of the corresponding size, wherein when the throttle position is the same, a torque corresponding to the first power output curve is smaller than a torque corresponding to the default power output curve, a torque corresponding to the second power output curve is greater than the torque corresponding to the default power output curve, and a torque corresponding to the third power output curve is greater than the torque corresponding to the second power output curve.

6. The system as claimed in claim 4, further comprising:

a mode indication apparatus, the mode indication apparatus being communicatively connected to the road surface recognition apparatus and the terrain mode selecting apparatus respectively, wherein the road surface recognition apparatus is further configured to send, when sending the corresponding first terrain mode request signal to the signal transfer apparatus, a first prompt request to the mode indication apparatus, the first prompt request enabling the mode indication apparatus to output corresponding prompt information to prompt a terrain mode requested by the first terrain mode request signal;

the terrain mode selecting apparatus is further configured to send, when sending the corresponding second terrain mode request signal to the signal transfer apparatus, a second prompt request to the mode indication apparatus, the second prompt request enabling the mode indication apparatus to output corresponding prompt information to prompt a terrain mode requested by the second terrain mode request signal;

and/or, the road surface recognition apparatus is further configured to send, when receiving execution information about a terrain mode starting failure forwarded by the signal transfer apparatus, a third prompt request to the mode indication apparatus, the third prompt request enabling the mode indication apparatus to stop outputting corresponding prompt information to cancel the prompt for a terrain mode corresponding to the first terrain mode request signal; and the terrain mode selecting apparatus is further configured to send, when receiving execution information about the terrain mode starting failure forwarded by the signal transfer apparatus, a fourth prompt request to the mode indication apparatus, the fourth prompt request enabling the mode indication apparatus to stop outputting corresponding prompt information to cancel the prompt for a terrain mode corresponding to the second terrain mode request signal.

7. The system as claimed in claim 6, wherein the all-terrain controller feeds back the period of the execution information to the signal transfer apparatus, the period being more than twice the period in which the signal transfer apparatus forwards the execution information to the road surface recognition apparatus and the terrain mode selecting apparatus.

8. The system as claimed in claim 7, further comprising:
an engine control apparatus, wherein the all-terrain controller is further configured to determine, after starting a corresponding terrain mode, a power output strategy corresponding to the current terrain mode according to a correspondence between terrain modes and preset power output strategies, and send the power output strategy to the engine control apparatus;

the engine control apparatus is configured to adjust an output torque of an engine according to a power output curve corresponding to the current power output strategy, the power output curve being a function curve using a throttle position as a variable and the output torque of the engine as an output;

the correspondence between various terrain modes in the all-terrain adaptive mode and power output strategies comprises: one-to-one correspondence of the common terrain mode, the snow mode, the mud mode and the sand mode with a common output strategy, a first output strategy, a second output strategy and a third output strategy;

the engine control apparatus is specifically configured to:

detect, if it is the common output strategy, the throttle position, obtain an output torque size of the engine according to the current throttle position and a default power output curve, and control the engine to output a torque of the corresponding size;

detect, if it is the first output strategy, the throttle position, obtain an output torque size of the engine according to the current throttle position and a first power output curve, and control the engine to output a torque of the corresponding size;

detect, if it is the second output strategy, the throttle position, obtain an output torque size of the engine according to the current throttle position and a second power output curve, and control the engine to output a torque of the corresponding size; and detect, if it is the third output strategy, the throttle position, obtain an output torque size of the engine according to the current throttle position and a third power output curve, and control the engine to output a torque of the corresponding size, wherein when the throttle position is the same, a torque corresponding to the first power output curve is smaller than a torque corresponding to the default power output curve, a torque corresponding to the second power output curve is greater than the torque corresponding to the default power output curve, and a torque corresponding to the third power output curve is greater than the torque corresponding to the second power output curve.

9. The system as claimed in claim 6, further comprising: an engine control apparatus, wherein the all-terrain controller is further configured to determine, after starting a corresponding terrain mode, a power output strategy corresponding to the current terrain mode according to a correspondence between terrain modes and preset power output strategies, and send the power output strategy to the engine control apparatus;

the engine control apparatus is configured to adjust an output torque of an engine according to a power output curve corresponding to the current power output strategy, the power output curve being a function curve using a throttle position as a variable and the output torque of the engine as an output;

the correspondence between various terrain modes in the all-terrain adaptive mode and power output strategies comprises: one-to-one correspondence of the common terrain mode, the snow mode, the mud mode and the sand mode with a common output strategy, a first output strategy, a second output strategy and a third output strategy;

the engine control apparatus is specifically configured to:

detect, if it is the common output strategy, the throttle position, obtain an output torque size of the engine according to the current throttle position and a default power output curve, and control the engine to output a torque of the corresponding size;

detect, if it is the first output strategy, the throttle position, obtain an output torque size of the engine according to the current throttle position and a first power output curve, and control the engine to output a torque of the corresponding size;

detect, if it is the second output strategy, the throttle position, obtain an output torque size of the engine according to the current throttle position and a second power output curve, and control the engine to output a torque of the corresponding size; and detect, if it is the third output strategy, the throttle position, obtain an output torque size of the engine according to the current throttle position and a third power output curve, and control the engine to output a torque of the corresponding size, wherein when the throttle position is the same, a torque corresponding to the first power output curve is smaller than a torque corresponding to the default power output curve, a torque corresponding to the second power output curve is greater than the torque corresponding to the default power output curve, and a torque corresponding to the third power output curve is greater than the torque corresponding to the second power output curve.

10. The system as claimed in claim 1, further comprising: an engine control apparatus, wherein the all-terrain controller is further configured to determine, after starting a corresponding terrain mode, a power output strategy corresponding to the current terrain mode according to a correspondence between terrain modes and preset power output strategies, and send the power output strategy to the engine control apparatus;

the engine control apparatus is configured to adjust an output torque of an engine according to a power output curve corresponding to the current power output strategy, the power output curve being a function curve using a throttle position as a variable and the output torque of the engine as an output;

the correspondence between various terrain modes in the all-terrain adaptive mode and power output strategies comprises: one-to-one correspondence of the common terrain mode, the snow mode, the mud mode and the sand mode with a common output strategy, a first output strategy, a second output strategy and a third output strategy;

the engine control apparatus is specifically configured to:

detect, if it is the common output strategy, the throttle position, obtain an output torque size of the engine according to the current throttle position and a default power output curve, and control the engine to output a torque of the corresponding size;

detect, if it is the first output strategy, the throttle position, obtain an output torque size of the engine according to the current throttle position and a first power output curve, and control the engine to output a torque of the corresponding size;

detect, if it is the second output strategy, the throttle position, obtain an output torque size of the engine according to the current throttle position and a second power output curve, and control the engine to output a torque of the corresponding size; and detect, if it is the third output strategy, the throttle position, obtain an output torque size of the engine according to the current throttle position and a third power output curve, and control the engine to output a torque of the corresponding size, wherein when the throttle position is the same, a torque corresponding to the first power output curve is smaller than a torque corresponding to the default power output curve, a torque corresponding to the second power output curve is greater than the torque corresponding to the default power output curve, and a torque corresponding to the third power output curve is greater than the torque corresponding to the second power output curve.

11. The system as claimed in claim 10, further comprising: a gearbox controller, wherein the all-terrain controller is further configured to determine, after starting a corresponding terrain mode, a power transmission strategy corresponding to the current terrain mode according to a correspondence between terrain modes and preset power transmission strategies, and send the power transmission strategy to the gearbox controller;

the gearbox controller is configured to control a gearbox of the vehicle to shift gears according to the current power transmission strategy to adjust a power transmission mechanism of the gearbox;

the correspondence between various terrain modes in the all-terrain adaptive mode and power transmission strategies comprises: one-to-one correspondence of the common terrain mode, the snow mode, the mud mode and the sand mode with a common power transmission strategy, a first power transmission strategy, a second power transmission strategy and a third power transmission strategy;

the gearbox controller is specifically configured to:

acquire, if it is the common power transmission strategy, the throttle position and a current vehicle speed, and send a gear shift request to a gearbox control unit when the throttle position and the vehicle speed satisfy a default combination condition, so as to switch the gearbox to a higher gear of the current gear;

acquire, if it is the first power transmission strategy, the throttle position and the current vehicle speed, and send a gear shift request to the gearbox control unit when the throttle position and the vehicle speed satisfy a first combination condition, so as to switch the gearbox to a higher gear of the current gear, the vehicle speed requirement in the first combination condition being less than the vehicle speed requirement in the default combination condition;

acquire, if it is the second power transmission strategy, the throttle position and the current vehicle speed, and send a gear shift request to the gearbox control unit when the throttle position and the vehicle speed satisfy a second combination condition, so as to switch the gearbox to a higher gear of the current gear, the vehicle speed requirement in the second combination condition being greater than the vehicle speed requirement in the default combination condition; and acquire, if it is the third power transmission strategy, the throttle position and the current vehicle speed, and send a gear shift request to the gearbox control unit when the throttle position and the vehicle speed satisfy a third combination condition, so as to switch the gearbox to a higher gear of the current gear, the vehicle speed requirement in the third combination condition being greater than the vehicle speed requirement in the second combination condition.

12. The system as claimed in claim 11, further comprising: a power distribution apparatus, wherein the all-terrain controller is further configured to determine, after starting a corresponding terrain mode, a power distribution strategy corresponding to the current terrain mode according to a correspondence between terrain modes and preset power distribution strategies, and send the power distribution strategy to the power distribution apparatus;

the power distribution apparatus is configured to switch a center differential of the vehicle to a corresponding locking mode according to the current power distribution strategy, and distribute torques to front and rear axles of the vehicle according to a torque distribution curve corresponding to the current power distribution strategy, the torque distribution curve being a function curve using the throttle position as a variable and a torque proportion of a driven axle as an output;

the correspondence between various terrain modes in the all-terrain adaptive mode and power distribution strategies comprises: one-to-one correspondence of the common terrain mode, the snow mode, the mud mode and the sand mode with a common distribution strategy, a first distribution strategy, a second distribution strategy and a third distribution strategy;

the power distribution apparatus is specifically configured to:

control, if it is the common distribution strategy, the center differential of the vehicle to switch to a smart control mode, acquire the throttle position, determine a first torque proportion corresponding to a driven axle according to the throttle position and a first torque distribution curve, and distribute torques to front and rear axles of the vehicle according to the first torque proportion;

control, if it is the first distribution strategy, the center differential of the vehicle to switch to a smart locking mode, acquire the throttle position, determine a second torque proportion corresponding to a driven axle according to the throttle position and a second torque distribution curve, and distribute torques to front and rear axles of the vehicle according to the second torque proportion; and control, if it is the second distribution strategy, the center differential of the vehicle to switch to a full locking mode, acquire the throttle position, determine a third torque proportion corresponding to a driven axle according to the throttle position and a third torque distribution curve, and distribute torques to front and rear axles of the vehicle according to the third torque proportion, wherein the driven axle is the front axle or the rear axle, a set locking degree is smaller than a maximum locking degree, and when the throttle position is the same, the second torque proportion is greater than the first torque proportion, and the third torque proportion is greater than the first torque proportion and smaller than or equal to the second torque proportion.

13. The system as claimed in claim 12, further comprising: a brake and torque decrease control apparatus, wherein the all-terrain controller is further configured to determine, after starting a corresponding terrain mode, a brake/torque strategy corresponding to the current terrain mode according to a correspondence between terrain modes and preset brake/torque strategies, and send the brake/torque strategy to the brake and torque decrease control apparatus;

the brake and torque decrease control apparatus is configured to adjust an output torque of the engine according to the current brake/torque strategy, and perform corresponding brake control on wheels;

the correspondence between various terrain modes in the all-terrain adaptive mode and brake/torque control strategies comprises: one-to-one correspondence of the common terrain mode, the snow mode, the mud mode and the sand mode with a common brake/torque strategy, a first brake/torque strategy, a second brake/torque strategy and a third brake/torque strategy;

the brake and torque decrease control apparatus is specifically configured to:

acquire, if it is the common brake/torque strategy, a front and rear axle speed difference of the vehicle, send a torque decrease request to the engine when the front and rear axle speed difference reaches a preset default speed difference threshold to decrease the output torque of the engine, acquire a yaw angle of the vehicle, and send, when the yaw angle reaches a set default yaw angle threshold, a brake request to a brake system to apply a corresponding size of brake force to each wheel;

acquire, if it is the first brake/torque strategy, the front and rear axle speed difference of the vehicle, send a torque decrease request to the engine when the front and rear axle speed difference reaches a first speed difference threshold to decrease the output torque of the engine, acquire the yaw angle of the vehicle, and send, when the yaw angle reaches a set first yaw angle threshold, a brake request to the brake system to apply a corresponding size of brake force to each wheel, the first speed difference threshold being smaller than the default speed difference threshold, and the first yaw angle threshold being smaller than the default yaw angle threshold;

acquire, if it is the second brake/torque strategy, the front and rear axle speed difference of the vehicle, send a torque decrease request to the engine when the front and rear axle speed difference reaches a second speed difference threshold to decrease the output torque of the engine, acquire the yaw angle of the vehicle, and send, when the yaw angle reaches a set second yaw angle threshold, a brake request to the brake system to apply a corresponding size of brake force to each wheel, the second speed difference threshold being greater than the default speed difference threshold, and the second yaw angle threshold being greater than the default yaw angle threshold; and acquire, if it is the third brake/torque strategy, the front and rear axle speed difference of the vehicle, send a torque decrease request to the engine when the front and rear axle speed difference reaches a third speed difference threshold to decrease the output torque of the engine, acquire the yaw angle of the vehicle, and send, when the yaw angle reaches a set third yaw angle threshold, a brake request to the brake system to apply a corresponding size of brake force to each wheel, the third speed difference threshold being greater than the second speed difference threshold, and the third yaw angle threshold being greater than the second yaw angle threshold, wherein the torque decrease request comprises a target torque value to adjust the output torque of the engine according to the target torque value, and the brake request comprises brake force distribution information to apply a corresponding size of brake force to each wheel according to the brake force distribution information; and under any two brake/torque strategies, at least one of the target torque value comprised in the torque decrease request and the brake force distribution information comprised in the brake request is different.

* * * * *